United States Patent
Onomura

(10) Patent No.: US 10,762,600 B2
(45) Date of Patent: Sep. 1, 2020

(54) IMAGE PROCESSING APPARATUS, IMAGE PROCESSING METHOD, AND NON-TRANSITORY COMPUTER-READABLE RECORDING MEDIUM

(71) Applicant: Olympus Corporation, Hachioji-shi, Tokyo (JP)

(72) Inventor: Kenichi Onomura, Hachioji (JP)

(73) Assignee: Olympus Corporation, Tokyo (JP)

( * ) Notice: Subject to any disclaimer, the term of this patent is extended or adjusted under 35 U.S.C. 154(b) by 271 days.

(21) Appl. No.: 15/970,861

(22) Filed: May 3, 2018

(65) Prior Publication Data

US 2018/0365802 A1    Dec. 20, 2018

(30) Foreign Application Priority Data

Jun. 15, 2017    (JP) ................................. 2017-117989

(51) Int. Cl.
*G06K 9/00* (2006.01)
*G06T 3/40* (2006.01)
*G06T 7/90* (2017.01)
*G06T 5/00* (2006.01)

(52) U.S. Cl.
CPC ............ *G06T 3/4015* (2013.01); *G06T 5/001* (2013.01); *G06T 5/003* (2013.01); *G06T 7/90* (2017.01); *G06T 2200/32* (2013.01); *G06T 2207/10024* (2013.01); *G06T 2207/20004* (2013.01); *G06T 2207/20012* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 7,626,727 B2 | 12/2009 | Sugimori | |
| 9,892,487 B1* | 2/2018 | Wong | ..................... G06T 3/4015 |
| 2012/0274817 A1* | 11/2012 | Sun | ......................... H04N 5/208 |
| | | | 348/243 |
| 2017/0118477 A1* | 4/2017 | Suzuki | ..................... H04N 9/64 |

FOREIGN PATENT DOCUMENTS

JP    2007-158509    6/2007

* cited by examiner

*Primary Examiner* — Wei Wen Yang
(74) *Attorney, Agent, or Firm* — John C. Pokotylo; Pokotylo Patent Services

(57) ABSTRACT

An image processing apparatus includes one or more processors including hardware that perform processing for generating a plurality of color planes from RAW image data having a mosaic color array, generating a luminance edge plane from the RAW image data, multiplying the luminance edge plane by a value of a gain, and adding, to each of the plurality of color planes, the luminance edge plane multiplied by the value of the gain.

7 Claims, 14 Drawing Sheets

| BAYER DATA | LUMINANCE EDGE GENERATION FILTER | LUMINANCE EDGE PLANE |
|---|---|---|
| R Gr R Gr / Gb B Gb B / R Gr R Gr / Gb B Gb B | -1 -1 / -1 2 2 -1 / -1 2 2 -1 / -1 -1 (Ye center) | Ye Ye Ye Ye / Ye Ye Ye Ye / Ye Ye Ye Ye / Ye Ye Ye Ye |

|  | LUMINANCE EDGE GAIN | DEMOSAIC FILTER |
|---|---|---|
| STILL IMAGE | SMALL | LPF WEAK |
| MOVING IMAGE | LARGE | LPF STRONG |

IMAGE PROCESSING APPARATUS, IMAGE PROCESSING METHOD, AND NON-TRANSITORY COMPUTER-READABLE RECORDING MEDIUM

CROSS REFERENCE TO RELATED APPLICATION

This application claims benefit of Japanese Application No. 2017-117989 filed in Japan on Jun. 15, 2017, the entire contents of which are incorporated herein by this reference.

BACKGROUND OF THE INVENTION

1. Field of the Invention

The present invention relates to an image processing apparatus, an image processing method, and a non-transitory computer-readable recording medium for processing RAW image data having a mosaic color array.

2. Description of the Related Art

As processing for RAW image data having a mosaic color array, for example, a technique for performing resize processing has been conventionally proposed.

For example, Japanese Patent Application Laid-Open Publication No. 2007-158509 (U.S. Pat. No. 7,626,727) describes a technique for, when resizing RAW image data having a Bayer array, demosaicking the RAW image data and thereafter YC-converting the RAW image data into luminance color difference data (YCbCr), resizing the luminance color difference data, and directly restoring the resized luminance color difference data to a form of the Bayer array.

SUMMARY OF THE INVENTION

An image processing apparatus according to an aspect of the present invention is an image processing apparatus that processes RAW image data having a mosaic color array. The image processing apparatus includes one or more processors including hardware. The one or more processors perform processing of: a demosaicking section configured to generate a plurality of color planes from the RAW image data; a luminance-edge generating section configured to generate a luminance edge plane from the RAW image data; a luminance-edge-gain multiplying section configured to multiply the luminance edge plane by a value of a gain; and a luminance-edge adding section configured to add, to each of the plurality of color planes, the luminance edge plane multiplied by the value of the gain.

An image processing method according to another aspect of the present invention is an image processing method for processing RAW image data having a mosaic color array. The image processing method includes: generating a plurality of color planes from the RAW image data; generating a luminance edge plane from the RAW image data; multiplying the luminance edge plane by a value of a gain; and adding, to each of the plurality of color planes, the luminance edge plane multiplied by the value of the gain.

A non-transitory computer-readable recording medium according to still another aspect of the present invention is a recording medium that records an image processing program for causing a computer to process RAW image data having a mosaic color array. The image processing program includes: generating a plurality of color planes from the RAW image data; generating a luminance edge plane from the RAW image data; multiplying the luminance edge plane by a value of a gain; and adding, to each of the plurality of color planes, the luminance edge plane multiplied by the value of the gain.

BRIEF DESCRIPTION OF THE DRAWINGS

FIG. 4 is a table for explaining processing for generating RGB planes from the Bayer data using demosaic filters in the first embodiment;

FIG. 5 is a table for explaining processing for generating a luminance edge plane from the Bayer data using a luminance edge generation filter in the first embodiment;

FIG. 6 is a table for explaining processing for reconstructing the Bayer data from the RGB planes added with luminance edges in the first embodiment;

FIG. 7 is a table showing an example in which setting of a value of a luminance edge gain and selection of a type of the demosaic filter are performed according to a discrimination result of a recording form in the first embodiment;

DETAILED DESCRIPTION OF THE PREFERRED EMBODIMENTS

Embodiments of the present invention are explained below with reference to the drawings.

First Embodiment

Figure 1:
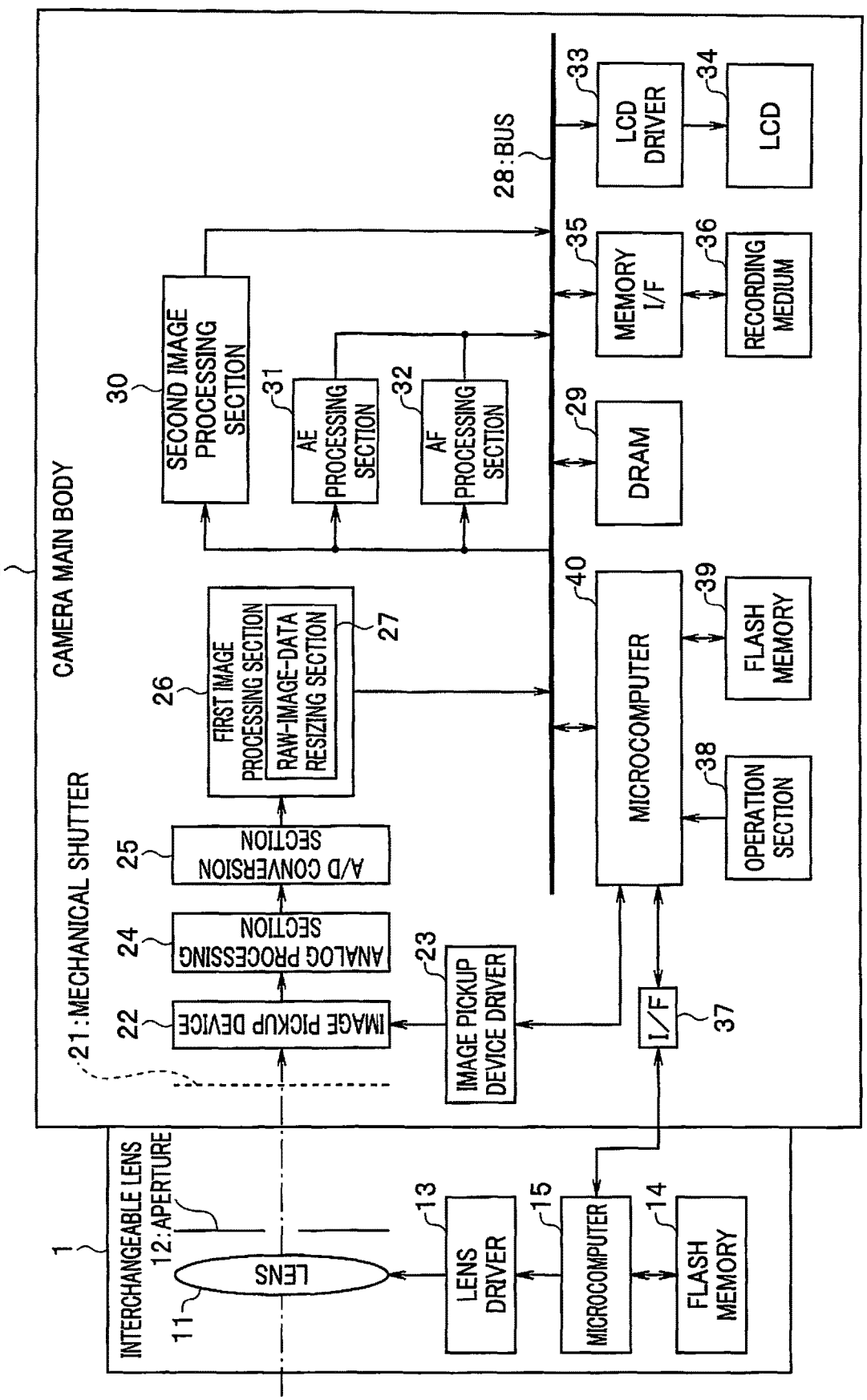
FIG. 1 is a block diagram showing a configuration of an image pickup apparatus applied with an image processing apparatus in a first embodiment of the present invention.

FIGS. 1 to 8 show a first embodiment of the present invention. FIG. 1 is a block diagram showing a configuration of an image pickup apparatus applied with an image processing apparatus.

Note that, in this embodiment, a digital camera is explained as an example of the image pickup apparatus. However, the image pickup apparatus is not limited to the digital camera but may be any apparatus including an image pickup function. A digital camera of a lens-interchangeable type is explained as an example of the digital camera. However, the digital camera may be a lens-integrated type.

The image pickup apparatus is configured by detachably connecting an interchangeable lens 1 and a camera body 2 via a lens mount or the like.

The interchangeable lens 1 includes a lens 11, an aperture 12, a lens driver 13, a flash memory 14, and a microcomputer 15.

The lens 11 is a photographing optical system for forming an optical image of an object on an image pickup device 22, explained below, of the camera body 2.

The aperture 12 is an optical aperture that controls a passing range of a light beam traveling from the lens 11 to the image pickup device 22.

The lens driver 13 drives the lens 11 to perform adjustment of a focus position on the basis of a command from the microcomputer 15. In addition, the lens driver 13 drives the aperture 12 to change an opening diameter on the basis of a command from the microcomputer 15. According to the driving of the aperture 12, brightness of the optical image of the object changes and, for example, size of a blur also changes.

The flash memory 14 is a storage medium that stores a control program executed by the microcomputer 15 and various kinds of information concerning the interchangeable lens 1.

The microcomputer 15 is a so-called lens-side computer and is connected to the lens driver 13, the flash memory 14, and an interface (I/F) 37 explained below. The microcomputer 15 communicates with a microcomputer 40 explained below, which is a body-side computer, via the interface 37, receives a command from the microcomputer 40, performs readout/writing of information stored in the flash memory 14, and controls the lens driver 13. Further, the microcomputer 15 transmits the various kinds of information concerning the interchangeable lens 1 to the microcomputer 40.

The camera body 2 includes a mechanical shutter 21, the image pickup device 22, an image pickup device driver 23, an analog processing section 24, an analog/digital conversion section (A/D conversion section) 25, a first image processing section 26 including a RAW-image-data resizing section 27, a bus 28, a DRAM 29, a second image processing section 30, an AE processing section 31, an AF processing section 32, an LCD driver 33, an LCD 34, a memory interface (memory I/F) 35, a recording medium 36, the interface (I/F) 37, an operation section 38, a flash memory 39, and the microcomputer 40.

The mechanical shutter 21 controls a time period in which a light beam from the lens 11 reaches the image pickup device 22. The mechanical shutter 21 is, for example, an optical shutter configured to cause a shutter curtain to travel. The mechanical shutter 21 is driven by a command of the microcomputer 40, for example, during still image photographing to control a reaching time period of the light beam to the image pickup device 22, that is, an exposure time period of the object by the image pickup device 22. On the other hand, the mechanical shutter 21 is maintained in an open state during a moving image photographing or during live view. Acquisition of respective frame images is performed by a so-called electronic shutter of the image pickup device 22. However, naturally, the electronic shutter may be used during the still image photographing.

The image pickup device 22 is an image pickup section including an image pickup surface on which a plurality of pixels are two-dimensionally arrayed at a predetermined pixel pitch. The image pickup section photoelectrically converts an optical image of the object formed by the lens 11 and the aperture 12 to generate an analog image signal on the basis of control by the microcomputer 40, which is an image-pickup control section.

The image pickup device 22 in this embodiment has a mosaic color array. More specifically, for example, the image pickup device 22 is configured as an image pickup device of a single-plate type including a color filter having a primary color Bayer array.

As it is well known, the primary color Bayer array has a configuration in which an array of 2×2 pixels is set as a basic color array, G (green) filters are disposed in diagonal positions of the basic color array, and R (red) filters and B (blue) filters are respectively disposed in remaining diagonal positions.

However, a color array of the image pickup device 22 is not limited to the Bayer array but may be any mosaic color array.

The image pickup device driver 23 drives the image pickup device 22 on the basis of a command from the microcomputer 40 and causes the image pickup device 22 to perform image pickup.

The analog processing section 24 reduces reset noise and the like and then performs waveform shaping on an analog image signal read out from the image pickup device 22 and further performs gain-up to obtain target brightness.

The A/D conversion section 25 converts the analog image signal outputted from the analog processing section 24 into a digital image signal (RAW image data).

The first image processing section 26 configures an image processing apparatus that processes RAW image data having a mosaic color array. The first image processing section 26 performs various kinds of processing in order to acquire image information related to AE (automatic exposure), AF (autofocus), AWB (auto white balance), or the like, which is basic control related to photographing, from the RAW image data.

The first image processing section 26 includes the RAW-image-data resizing section 27 as explained above. The RAW-image-data resizing section 27 changes an image size of the RAW image data outputted from the A/D conversion section 25 (usually, changes the image size to be small but may change the image size to be large) and generates resized RAW image data. Various parameters concerning the resize processing performed by the RAW-image-data resizing section 27 are basically set by the microcomputer 40.

One of reasons for resizing the RAW image data is to reduce the number of pixels to reduce a processing load on the second image processing section 30 (or the AE processing section 31, the AF processing section 32, or the like) explained below. For example, as a moving image, these days, a 4K moving image or an 8K moving image is being put to practical use. However, the number of pixels of the image pickup device 22 varies depending on a product. In general, the number of pixels does not coincide with the number of pixels of the 4K moving image or the 8K moving image. As explained below, the second image processing section 30 performs various kinds of image processing for generating image data for display or for recording from the RAW image data. Therefore, when the second image processing section 30 performs image processing of unresized RAW image data having a frame rate of 30 fps or 60 fps, a load on the second image processing section 30 is large.

Therefore, the resize of the RAW image data is performed by, for example, the first image processing section 26 to reduce the load on the second image processing section 30.

As shown in FIG. 1, the RAW-image-data resizing section 27 is suitably disposed in the first image processing section 26. This is because if this disposition is adopted, the size of data transferred to the DRAM 29 can be reduced. In this case, a data amount transmitted through the bus 28 can be reduced not to reach a band limit of the DRAM 29. A storage capacity of the DRAM 29 can be saved (therefore, the number of image frames that can be stored in the DRAM 29 increases).

The bus 28 is a transfer path for transferring various data and a control signal generated in a certain place in the image pickup apparatus to another place in the image pickup apparatus. The bus 28 in this embodiment is connected to the first image processing section 26, the DRAM 29, the second image processing section 30, the AE processing section 31, the AF processing section 32, the LCD driver 33, the memory I/F 35, and the microcomputer 40.

RAW image data (RAW image data resized according to necessity) outputted from the first image processing section 26 is transferred via the bus 28 and once stored in the DRAM 29.

The DRAM 29 is a storing section that temporarily stores various data such as the RAW image data explained above and image data processed in the second image processing section 30 or the like.

The second image processing section 30 configures an image processing apparatus that processes RAW image data having a mosaic color array. The second image processing section 30 performs basic image processing such as OB subtraction, white balance (WB) gain, demosaic, noise reduction, color conversion, gamma conversion, and enlargement and reduction on the RAW image data inputted via the bus 28. Note that data compression/data expansion in recording a still image or a moving image in or reading out a still image or a moving image from the recording medium 36 may be performed by the second image processing section 30 or may be performed by providing a dedicated compressing and expanding section.

The AE processing section 31 extracts a luminance component from the RAW image data inputted via the bus 28 and calculates a proper exposure condition (for giving proper exposure, for example, values such as Tv, Av, and Sv) on the basis of the extracted luminance component. The calculated proper exposure condition is used for automatic exposure (AE) control. More specifically, control of the aperture 12 based on the Av value, control of the mechanical shutter 21 based on the Tv value, exposure timing control of the image pickup device 22 (control of a so-called electronic shutter) based on the Tv value, gain control of the analog processing section 24 (or digital gain control of the second image processing section 30 or the like) based on the Sv value, or the like is performed.

The AF processing section 32 extracts a signal of a high-frequency component from the RAW image data inputted via the bus 28 and acquires a focus evaluation value through AF (autofocus) integration processing. The acquired focus evaluation value is used for AF driving of the lens 11. Note that, naturally, AF is not limited to such contrast AF. The AF processing section 32 may be configured to perform, for example, phase difference AF using a dedicated AF sensor (or a pixel for AF on the image pickup device 22).

The LCD driver 33 is a display-device driving section. The LCD driver 33 reads out image data stored in the DRAM 29 after being subjected to image processing by the second image processing section 30, converts the read-out image data into a video signal, and controls to drive the LCD 34 to cause the LCD 34 to display an image based on the video signal.

The LCD 34 is a display device. The LCD 34 displays an image according to the driving control of the LCD driver 33 explained above and displays various kinds of information related to the image pickup apparatus.

The memory I/F 35 is a recording control section that performs control for recording image data in the recording medium 36. Further, the memory I/F 35 also performs readout of image data from the recording medium 36.

The recording medium 36 is a recording section that stores image data in a nonvolatile manner. The recording medium 36 is configured by, for example, a memory card that can be attached to and detached from the camera body 2. However, the recording medium 36 is not limited to the memory card but may be a disk-like recording medium or may be any other recording medium. Therefore, the recording medium 36 does not need to be a component peculiar to the image pickup apparatus.

The interface 37 connects the microcomputer 15 of the interchangeable lens 1 and the microcomputer 40 of the camera body 2 to be capable of bidirectionally communicating with each other.

The operation section 38 is a section for performing various operation inputs to the image pickup apparatus. The operation section 38 includes a power button for turning on and off a power supply of the image pickup apparatus and operation buttons such as a release button formed by a two-stage operation button including, for example, a 1st (first) release switch and a 2nd (second) release switch for instructing a start of image photographing, a reproduction button for performing reproduction of a recorded image, a menu button for performing setting and the like of the image pickup apparatus, a cross key used for selection operation for an item, and an OK button used for decision operation for the selected item. Items that can be set using the menu button, the cross key, the OK button, and the like include a photographing mode (a still image photographing mode, a moving image photographing mode, etc.), a recording mode, and a reproduction mode. When operation is performed on the operation section 38, a signal corresponding to operation content is outputted to the microcomputer 40.

The flash memory 39 is a storage medium that stores, in a nonvolatile manner, a processing program (including an image processing program for performing image processing) executed by the microcomputer 40 and various kinds of information related to the image pickup apparatus. The information stored by the flash memory 39 includes, for example, a model name and a manufacture number for specifying the image pickup apparatus, parameters used for image processing, and setting values set by a user. Further, as the parameters used for the image processing, coefficients of various filters related to processing performed by the RAW-image-data resizing section 27, a setting value of a luminance edge gain, and the like are included. The information stored by the flash memory 39 is read by the microcomputer 40.

The microcomputer 40 is a microcomputer that controls the respective sections in the camera body 2 and transmits a command to the microcomputer 15 via the interface 37 to control the interchangeable lens 1. The microcomputer 40 is a control section that collectively controls the image pickup apparatus. When an operation input is performed by the user from the operation section 38, the microcomputer 40 analyzes inputted information. The microcomputer 40 reads parameters related to processing from the flash memory 39 and executes various sequences corresponding to operation content according to the processing program stored in the flash memory 39.

The microcomputer 40 performs, via the microcomputer 15 and the lens driver 13, control of the aperture 12 based on the Av value calculated by the AE processing section 31 and performs gain control of the analog processing section 24 (or digital gain control of the second image processing section 30) based on the Sv value calculated by the AE processing section 31.

Further, during the still image photographing, the microcomputer 40 performs control of the mechanical shutter 21 based on the Tv value calculated by the AE processing section 31.

In addition, the microcomputer 40 is a control section that sets various parameters concerning resize processing (e.g., the parameters read from the flash memory 39 explained above) in the RAW-image-data resizing section 27 to perform at least one of selection of a type of a demosaic filter used by a demosaicking section 27a (see FIG. 2) when generating a color plane and setting of a value of a gain (a luminance edge gain) multiplied by a luminance-edge-gain multiplying section 27c (see FIG. 2) as explained below.

The microcomputer 40 also configures the image processing apparatus that processes RAW image data having a mosaic color array.

Figure 2:
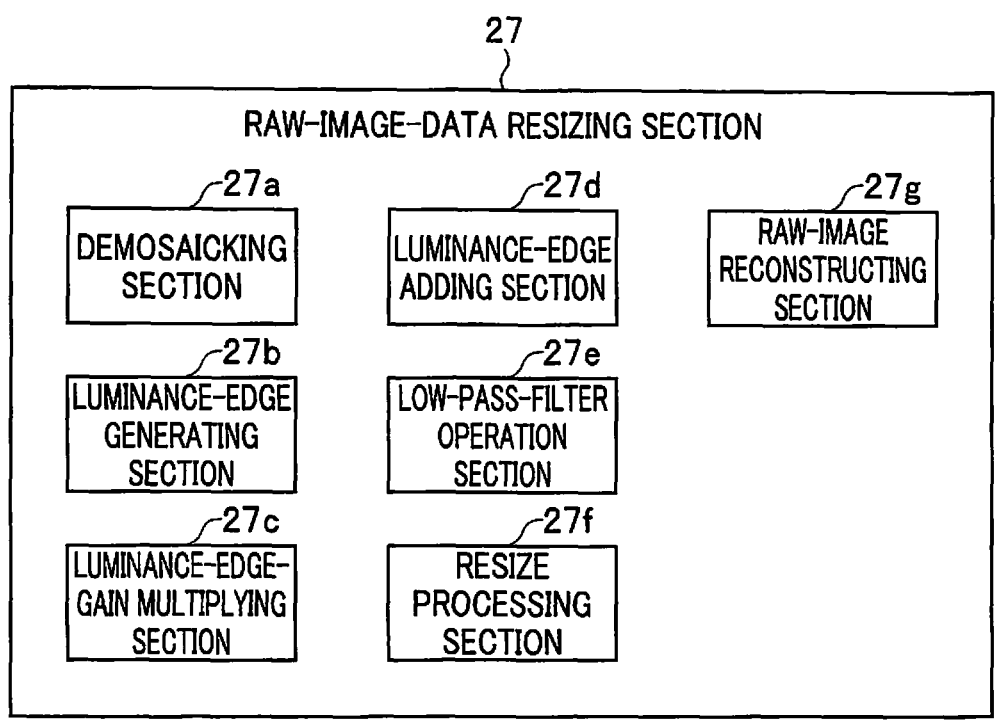
FIG. 2 is a block diagram showing a configuration of a RAW-image-data resizing section in the image processing apparatus in the first embodiment.

FIG. 2 is a block diagram showing a configuration of a RAW-image-data resizing section 27 in the image processing apparatus.

The RAW-image-data resizing section 27 includes, as shown in FIG. 2, the demosaicking section 27a, a luminance-edge generating section 27b, a luminance-edge-gain multiplying section 27c, a luminance-edge adding section 27d, a low-pass-filter (LPF) operation section 27e, a resize processing section 27f, and a RAW-image reconstructing section 27g (a connection state of the respective sections and a flow of processing are explained below with reference to FIG. 3).

The demosaicking section 27a generates a plurality of color planes (in this embodiment, an R plane, a G plane, and a B plane) from RAW image data (in this embodiment, Bayer data). The demosaicking section 27a generates the plurality of color planes from the RAW image data using, for example, demosaic filters (or other arithmetic processing or the like). In this embodiment, as explained below, the demosaicking section 27a includes a plurality of types of demosaic filters.

The luminance-edge generating section 27b is a section that generates a luminance edge plane from the RAW image data. The luminance-edge generating section 27b performs the generation of the luminance edge plane using, for example, a luminance edge generation filter (or other arithmetic processing or the like).

The luminance-edge-gain multiplying section 27c multiplies the luminance edge plane by a value of a gain (a luminance edge gain). The luminance-edge-gain multiplying section 27c can change the value of the gain.

The luminance-edge adding section 27d adds a value of the luminance edge plane multiplied by the value of the gain to each of the plurality of color planes.

Figure 3:
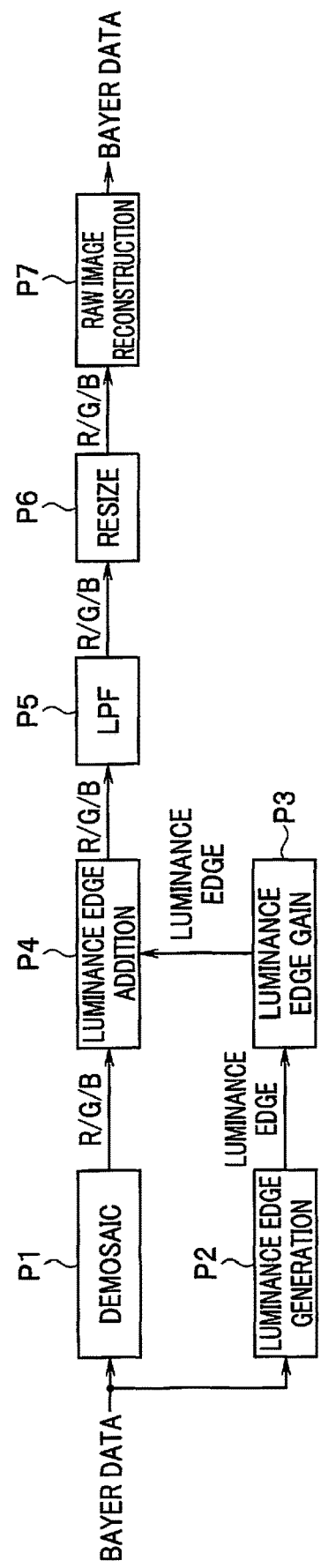
FIG. 3 is a diagram showing a flow of resize processing for Bayer data by the RAW-image-data resizing section in the first embodiment.

The low-pass-filter operation section 27e is provided between the luminance-edge adding section 27d and the resize processing section 27f (see FIG. 3). The low-pass-filter operation section 27e applies a low-pass filter to the plurality of color planes added with the value of the luminance edge plane multiplied by the gain.

The resize processing section 27f resizes the plurality of color planes added with the value of the luminance edge plane multiplied by the gain.

The RAW-image reconstructing section 27g reconstructs, from the resized plurality of color planes, resize RAW image data having the same basic color array as the basic color array of the RAW image data.

A flow of processing of the RAW-image-data resizing section 27 shown in FIG. 2 is going to be explained with reference to FIG. 3. FIG. 3 is a diagram showing a flow of resize processing of Bayer data by the RAW-image-data resizing section 27.

When the RAW image data is inputted from the A/D conversion section 25, the demosaicking section 27a applies demosaic filters to the RAW image data, which is the Bayer data, to generate an R plane in which pixels of R components are disposed without a missing position, a G plane in which pixels of G components are disposed without a missing position, and a B plane in which pixels of B components are disposed without a missing position (P1).

Figure 4:
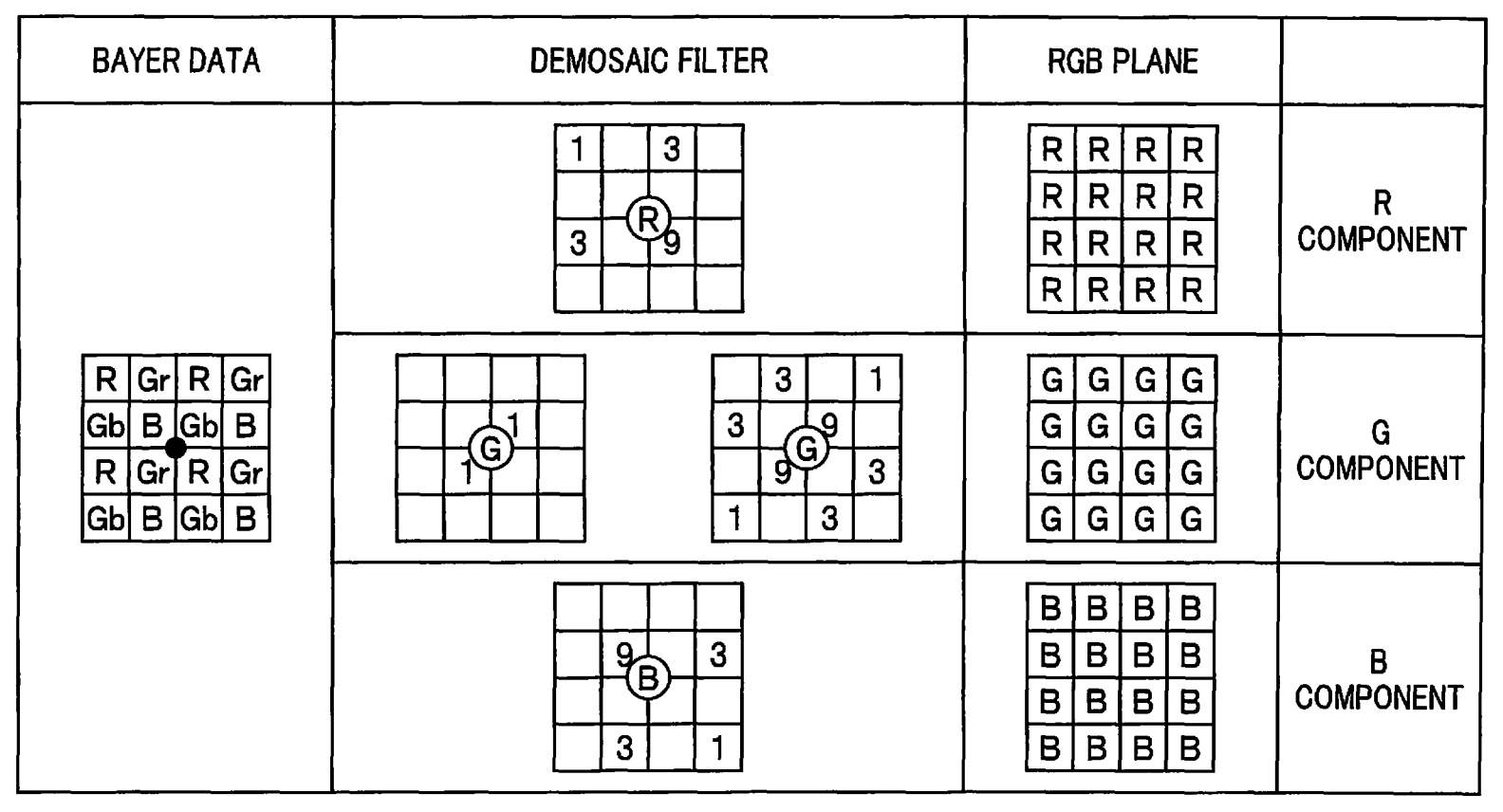

FIG. 4 is a table for explaining processing for generating RGB planes from the Bayer data using the demosaic filters.

As explained above, the image pickup device 22 is configured as, for example, the image pickup device of the single plate type including the color filter having the primary color Bayer array. Therefore, the RAW image data converted by the A/D conversion section 25 is also the Bayer data having the primary color Bayer array.

In FIG. 4, a 4×4 pixel array portion in the RAW image data is shown. A horizontal direction pixel position from left to right is represented as x and a vertical direction pixel position from up to down is represented as y. Pixels are represented by (x,y) coordinates; for example, a pixel at an upper left corner is represented as R(1,1), a pixel at an upper right corner is represented as Gr(4,1), a pixel at a lower left corner is represented as Gb(1,4), and a pixel at a lower right corner is represented as B(4,4).

In this case, a value of an R pixel for the R plane (an R pixel in a center position of the 4×4 pixel array) is calculated as follows:

$$R=\{R(1,1)+3\times R(3,1)+3\times R(1,3)+9\times R(3,3)\}/16$$

In the demosaic filters shown in FIG. 4, filter coefficients (weights) are indicated by integers. Description of the filter coefficients is omitted. However, actually, normalized values (in this example of R components, $1/16$, $3/16$, $3/16$, and $9/16$) are used. Filter coefficients of pixels, values of the filter coefficients of which are not shown in FIG. 4, are 0 (the same applies blow).

Similarly, a value of a B pixel for the B plane (a B pixel in the center position of the 4×4 pixel array) is calculated as follows:

$$B=\{9\times B(2,2)+3\times B(4,2)+3\times B(2,4)+B(4,4)\}/16$$

On the other hand, a value of a G pixel for the G plane (a G pixel in the center position of the 4×4 pixel array) is calculated using two types of demosaic filters having different effects of a low-pass filter (LPF).

First, when a demosaic filter having a weak effect of a low-pass filter (LPF) (a demosaic filter shown on a left side in a G component field in FIG. 4: the LPF effect is weak because only two G components close to the center position of the 4×4 pixel array are used) is used, the value of the G pixel for the G plane is calculated as follows:

$$G=\{Gb(3,2)+Gr(2,3)\}/2$$

On the other hand, when a demosaic filter having a strong effect of a low-pass filter (LPF) (a demosaic filter shown on a right side in the G component field in FIG. 4: the LPF effect is strong because all G components in the 4×4 pixel array are used) is used, the value of the G pixel for the G plane is calculated as follows:

$$G=\{3{\times}Gr(2,1)+Gr(4,1)+3{\times}Gb(1,2)+9{\times}Gb(3,2)+9{\times}Gr(2,3)+3{\times}Gr(4,3)+Gb(1,4)+3{\times}Gb(3,4)\}/32$$

Note that two types of demosaic filters are used concerning the G pixel. However, three or more types of demosaic filters may be used. Components for which a plurality of types of demosaic filters are used are not limited to G components. Pluralities of types of demosaic filters may be used for the R components and the B components.

The demosaic processing explained above is performed on the entire RAW image while shifting pixel positions in a horizontal direction and a vertical direction, whereby the R plane, the G plane, and the B plane are generated.

For example, in parallel to the demosaic processing explained above, the luminance-edge generating section 27b applies the luminance edge generation filter to the RAW image data, which is the Bayer data, and performs luminance edge generation processing to generate a luminance edge plane in which pixels of luminance edge components are disposed without a missing position (P2).

FIG. 5 is a table for explaining processing in which the luminance-edge generating section 27b generates a luminance edge plane from the Bayer data using the luminance edge generation filter.

More specifically, a value of a luminance edge pixel (represented as Ye because the luminance edge pixel is an edge of a luminance component Y) for the luminance edge plane (a Ye pixel in the center position of the 4×4 pixel array) is calculated as follows:

$$Ye=\{-Gr(2,1)-R(3,1)-Gb(1,2)+2{\times}B(2,2)+2{\times}Gb(3,2)-B(4,2)-R(1,3)+2{\times}Gr(2,3)+2{\times}R(3,3)-Gr(4,3)-B(2,4)-Gb(3,4)\}$$

Note that a filter shown in a luminance edge generation filter field in FIG. 5 is a filter obtained by combining a simple luminance component extraction filter (or a more accurate luminance component extraction filter may be used) for generating the luminance component Y in a 2×2 pixel array according to $$Y=(R+Gr+Gb+B)/4$$

and an edge extraction filter (in this example, a Laplacian filter near 4) for generating the luminance edge pixel Ye with respect to luminance components of a 3×3 pixel array according to $$Ye=\{-Y(2,1)-Y(1,2)+4{\times}Y(2,2)-Y(3,2)-Y(2,3)\}.$$

The luminance-edge generating section 27b performs the luminance edge generation processing explained above on the entire RAW image while shifting the pixel positions in the horizontal direction and the vertical direction, whereby a Ye plane, which is a luminance edge plane, is generated.

Subsequently, the luminance-edge-gain multiplying section 27c multiplies the respective pixel values of the luminance edge plane generated by the luminance-edge generating section 27b by a value of a luminance edge gain (P3). The value of the luminance edge gain is a constant not depending on a pixel position (a so-called global constant). As the value of the luminance edge gain, the same value may be used for all color components or a different value may be used for each of the color components in order to give more generality to the color components. In this embodiment, as explained below, the value of the luminance edge gain takes a different value according to whether an image to be acquired is a still image or a movie.

Subsequently, the luminance-edge adding section 27d adds, for each same pixel position, the luminance edge plane multiplied by the value of the luminance edge gain to each of the R plane, the G plane, and the B plane generated by the demosaicking section 27a (P4).

More specifically, when a pixel position on a plane is represented as (i,j), a value of a luminance gain edge for an R component is represented as gr, a value of a luminance edge gain for a G component is represented as gg, and a value of a luminance edge gain for a B component is represented as gb (a more general case in which the value of the luminance edge gain is different for each of the color components is assumed), RGB components R', G', and B' after the luminance edge addition are calculated as follows:

$$R'(i,j)=R(i,j)+gr{\times}Ye(i,j)$$

$$G'(i,j)=G(i,j)+gg{\times}Ye(i,j)$$

$$B'(i,j)=B(i,j)+gb{\times}Ye(i,j)$$

The luminance-edge adding section 27d performs such luminance edge addition processing to all the pixel positions (i,j) on the plane to calculate values of the RGB planes after the luminance edge addition.

Further, the low-pass-filter operation section 27e applies the low-pass filter to each of the RGB planes after the luminance edge addition (P5). The resize processing section 27f performs the resize processing (P6).

Note that assuming that the resize processing is image reduction processing, the low-pass filter is applied before the resize processing. However, for example, when a resize ratio is close to 1 or when the resize processing is image enlargement processing, the low-pass filter may be omitted. In this way, the low-pass filter operation section 27e is not an essential component.

When the resize processing explained above is performed, the RAW-image reconstructing section 27g reconstructs the RAW image data (the resize RAW image data), which is the Bayer data, from the R plane, the G plane, and the B plane after the resize (P7).

Figure 6:
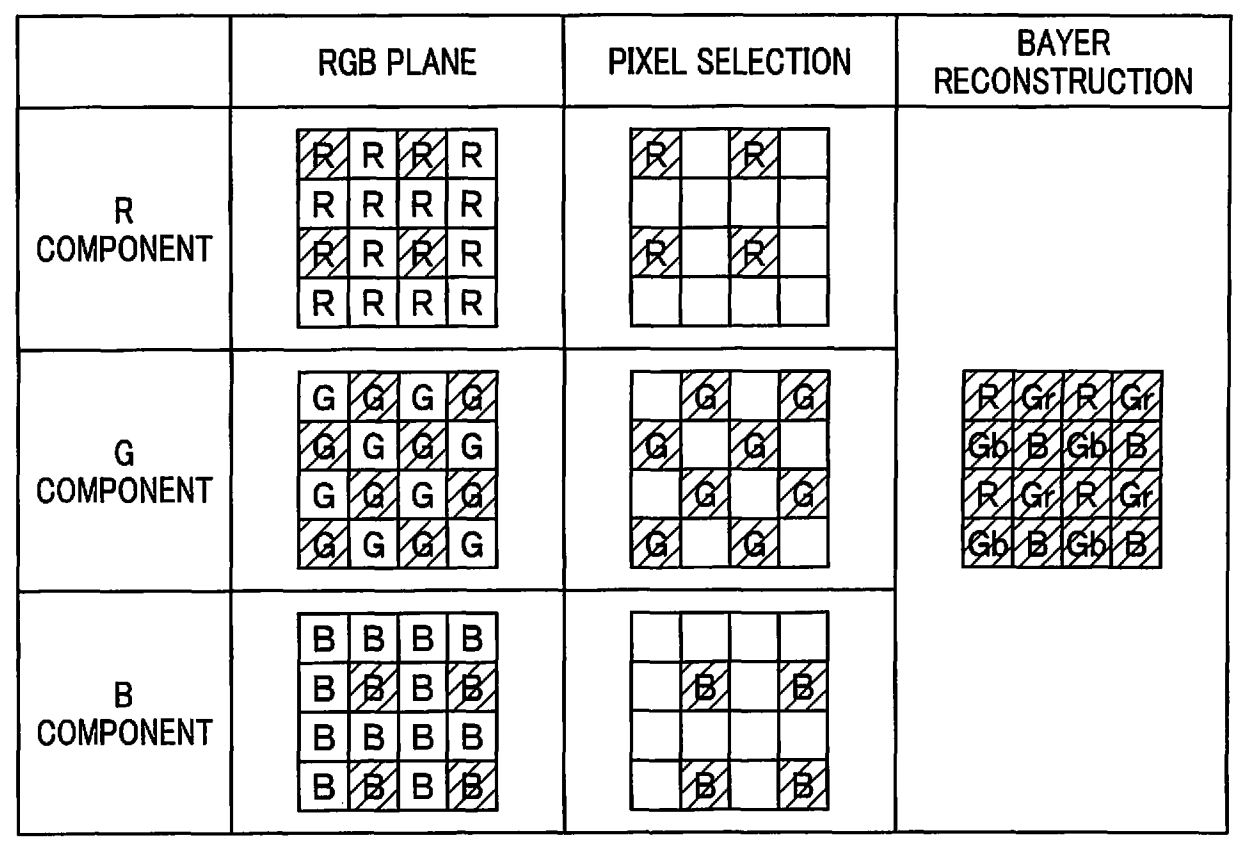

FIG. 6 is a table for explaining processing for reconstructing the Bayer data from the RGB planes to which the RAW-image-data resizing section 27 adds the luminance edges.

In an example shown in FIG. 6, the RAW-image-data resizing section 27 selects pixels in R pixel positions in the Bayer array from the R plane, selects pixels in G pixel positions in the Bayer array from the G plane, selects pixels in B pixel positions in the Bayer array from the B plane, and configures one Bayer image with the selected pixels to perform reconstruction of the RAW image data. Note that although there is no distinction between Gr and Gb in the pixels selected from the G plane, Gr and Gb are customarily described in the reconstructed Bayer image. The reconstruction of the RAW image data is not limited to this method. Other appropriate methods may be used.

Figure 8:
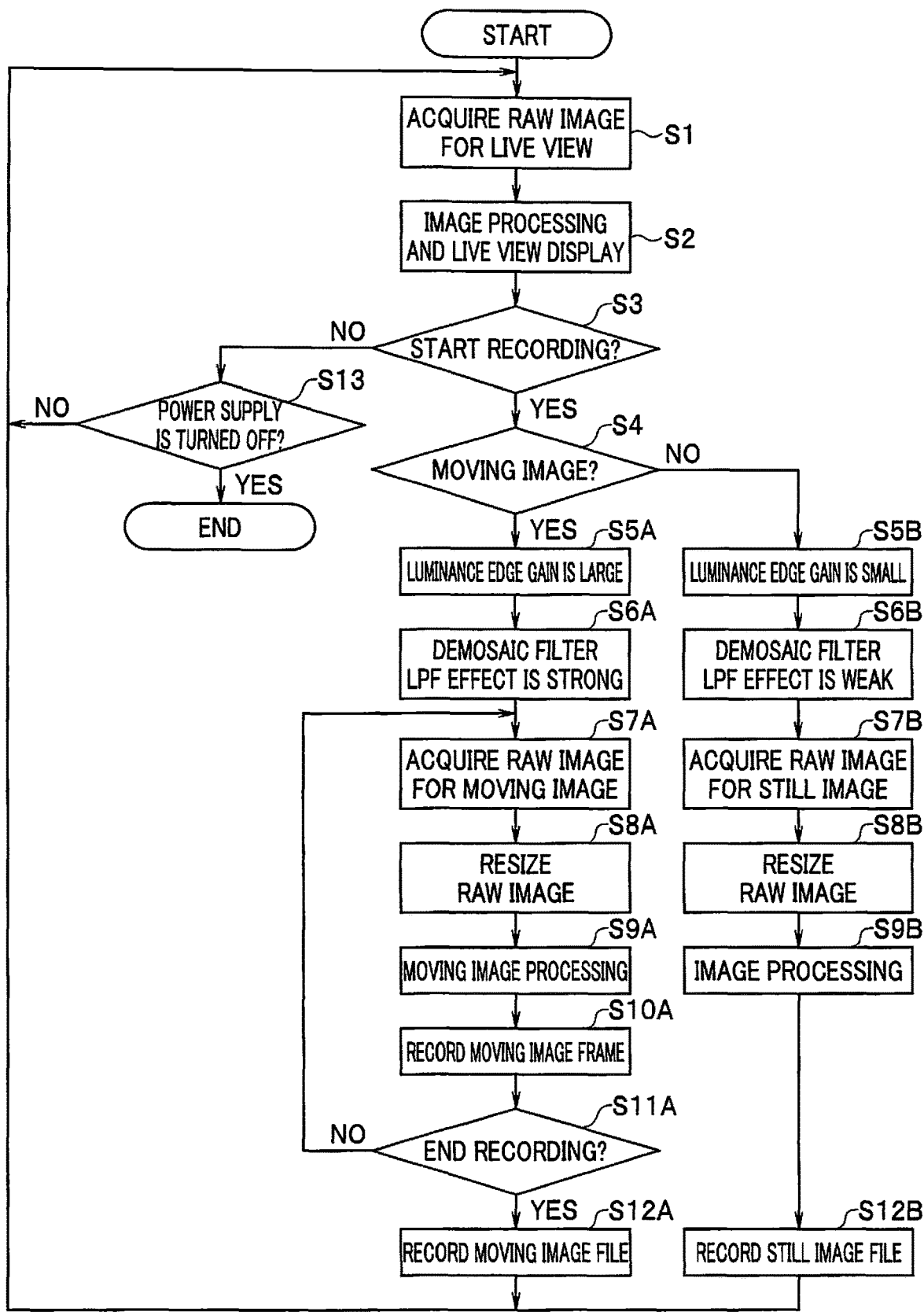
FIG. 8 is a flowchart showing action of the image pickup apparatus applied with the image processing apparatus in the first embodiment.

Action of the image pickup apparatus is explained with reference to FIGS. 7 and 8. FIG. 7 is a table showing an example in which setting of a value of a luminance edge gain and selection of a type of a demosaic filter are performed according to a discrimination result of a recording form. FIG. 8 is a flowchart showing action of the image pickup apparatus applied with the image processing apparatus.

For example, when the power button of the image pickup apparatus is turned on, whereby processing shown in FIG. 8 is started, a RAW image for live view is acquired (step S1).

The acquired RAW image is subjected to image processing for live view by the first image processing section 26 and the second image processing section 30 and displayed on the LCD 34 by the LCD driver 33 (step S2).

Thereafter, the microcomputer 40 determines whether a start of image recording is instructed by operation of the release button (step S3).

When determining that the recording start is instructed, the microcomputer 40 determines whether the recording mode is a moving image recording mode or a still image recording mode (step S4). That is, the microcomputer 40 functions as a recording-form discriminating section that discriminates which of a still image or a moving image a recording form of RAW image data is.

When determining that the recording mode is the moving image recording mode, the microcomputer 40 sets, in the luminance-edge-gain multiplying section 27c, a value of a luminance edge gain set in advance for the moving image recording mode (step S5A). As shown in FIG. 7, the value of the luminance edge gain set in advance for the moving image recording mode is larger than a value of a luminance edge gain set in advance for the still image recording mode.

Further, the microcomputer 40 sets, in the demosaicking section 27a, a demosaic filter having a strong effect of a low-pass filter (LPF) (a demosaic filter shown on the right side in the G component field in FIG. 4) of two types of demosaic filters prepared in advance for the G plane, for example, shown in FIG. 4 (step S6A).

The image pickup device 22, the analog processing section 24, and the A/D conversion section 25 acquire a RAW image for a moving image (step S7A). The RAW-image-data resizing section 27 resizes the RAW image on the basis of control by the microcomputer 40 to be a size related to an image size of the moving image (which is a size close to the image size of the moving image in some cases or a size larger or smaller than the image size of the moving image in other cases) (step S8A).

Thereafter, the first image processing section 26 and the second image processing section 30 perform image processing for the moving image (step S9A) and records a moving image frame after the processing in the recording medium 36 via the memory I/F 35 (step S10A). Note that it goes without saying that display on the LCD 34 may also be performed in the moving image recording.

Subsequently, the microcomputer 40 determines whether an end of the image recording is instructed by operation of the release button (step S11A).

When it is determined that the end of the image recording is not instructed, the processing returns to step S7A, a RAW image of a next frame is acquired and the processing explained above is performed.

When determining in step S11A that the end of the image recording is instructed, the microcomputer 40 records, as one moving image file, a moving image frame group recorded in frame units in the recording medium 36 (step S12A).

On the other hand, when determining in step S4 that the recording mode is the still image recording mode, the microcomputer 40 sets, in the luminance-edge-gain multiplying section 27c, a value of a luminance edge gain set in advance for the still image recording mode (step S5B). As explained above, the value of the luminance edge gain set in advance for the still image recording mode is smaller than the value of the luminance edge gain set in advance for the moving image recording mode (see FIG. 7).

Further, the microcomputer 40 sets, in the demosaicking section 27a, a demosaic filter having a weak effect of a low-pass filter (LPF) (a demosaic filter shown on the left side in the G component field in FIG. 4) of the two types of demosaic filters prepared in advance for the G plane, for example, shown in FIG. 4 (step S6B).

The image pickup device 22, the analog processing section 24, and the A/D conversion section 25 acquire a RAW image for a still image (step S7B). The RAW-image-data resizing section 27 resizes the RAW image on the basis of control by the microcomputer 40 to be a size related to an image size of the still image (which is a size close to the image size of the still image in some cases or a size larger or smaller than the image size of the still image in other cases) (step S8B).

Thereafter, the first image processing section 26 and the second image processing section 30 perform image processing for the still image (step S9B) and records a still image after the processing in the recording medium 36 as an image file via the memory I/F 35 (step S12B). Note that, in the recording of the still image file, the recorded still image may also be displayed on the LCD 34.

On the other hand, when determining in step S3 that the recording start is not instructed, the microcomputer 40 determines whether the power button is turned off (step S13).

When it is determined that the power button is not turned off or when the processing in step S12A or step S12B is performed, the processing returns to the live view in step S1 and step S2.

When determining in step S13 that the power button is turned off, the microcomputer 40 ends the processing.

Note that, in the above explanation, both of the selection of the type of the demosaic filter and the setting of the value of the luminance edge gain are performed according to the discrimination result of the recording form. However, effects can be obtained when only one of the selection of the type of the demosaic filter and the setting of the value of the luminance edge gain is performed. Therefore, at least one of the selection of the type of the demosaic filter and the setting of the value of the luminance edge gain only has to be performed.

According to the first embodiment explained above, the RAW-image-data resizing section 27 multiplies the luminance edge plane generated from the RAW image data by the gain value and adds the luminance edge plane multiplied by the gain value to each of the plurality of color planes generated from the RAW image data. Therefore, thereafter, when resize is performed and then the RAW image data having the mosaic color array is reconstructed, it is possible to obtain high-quality RAW image data having a mosaic color array.

When the microcomputer 40, which is the control section, selects a type of a demosaic filter, it is possible to adjust an LPF effect of the demosaic filter. Therefore, if a demosaic filter having a strong LPF effect is used, it is possible to prevent high-frequency moire. On the other hand, if a demosaic filter having a weak LPF effect is used, it is possible to improve high-frequency reproducibility.

On the other hand, when the microcomputer 40, which is the control section, sets a value of a luminance edge gain, it is possible to prevent, by reducing a value of a gain, high-frequency moire at a time when chroma of an image is high, and it is possible to improve the high-frequency reproducibility by increasing the value of the gain.

In the case of the still image, since the high-frequency moire stands still, the high-frequency moire is relatively less bothersome. However, in the case of the moving image, the high-frequency moire moves to be conspicuous. On the other hand, at least one of the selection of the type of the demosaic filter and the setting of the value of the gain is performed according to the discrimination result about which of the still image or the moving image the recording form is. Therefore, it is possible to prevent the high-frequency moire of the moving image and improve the high-frequency reproducibility of the still image.

More specifically, in the case of the moving image, it is possible to improve the high-frequency reproducibility by setting the value of the luminance edge gain to a large value, and it is possible to prevent the high-frequency moire by using the demosaic filter having the strong LPF effect.

On the other hand, in the case of the still image, by setting the value of the luminance edge gain to a small value and using the demosaic filter having the weak LPF effect, it is possible to prevent deterioration in the high-frequency reproducibility of the value of the luminance edge gain when an image has high chroma.

The resize RAW image data is reconstructed after the plurality of color planes added with the luminance edge plane is resized. Therefore, it is possible to obtain resized high-quality RAW image data having a mosaic color array.

Further, before the resize processing, the RAW-image-data resizing section 27 applies the low-pass filter to the plurality of color planes added with the luminance edge plane. Therefore, it is possible to prevent, for example, occurrence of aliasing distortion involved in an image reduction.

Second Embodiment

Figure 9:
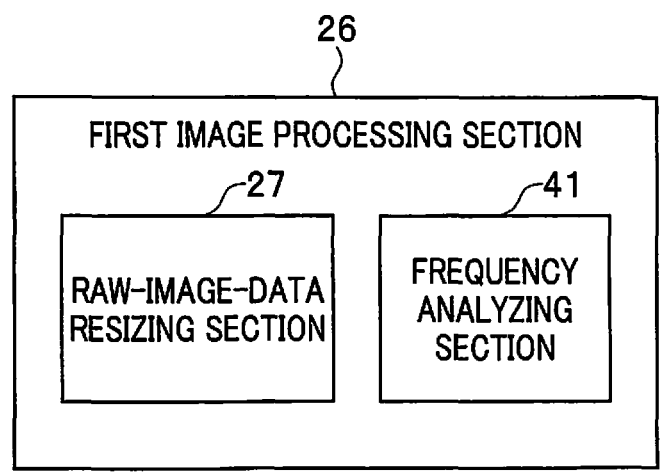
FIG. 9 is a block diagram showing a configuration of a first image processing section in a second embodiment of the present invention.
Figure 10:
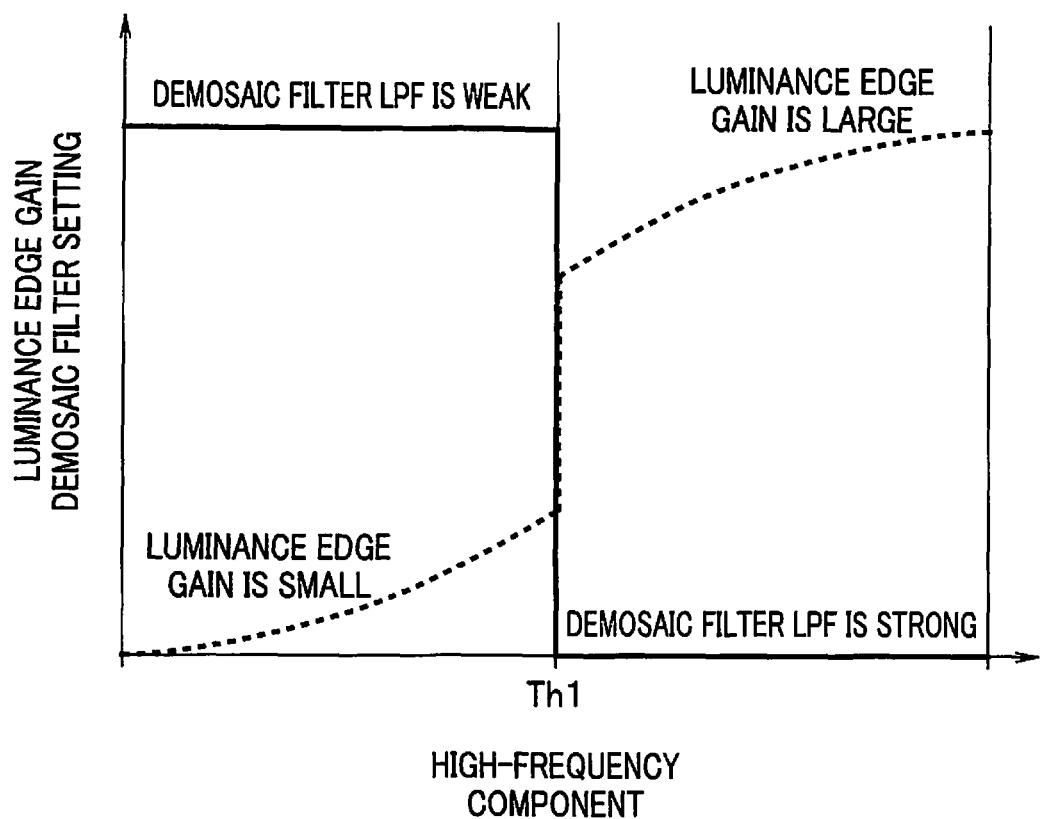
FIG. 10 is a graph showing an example in which setting of a value of a luminance edge gain and selection of a type of a demosaic filter are performed according to a high-frequency component of RAW image data in the second embodiment.
Figure 11:
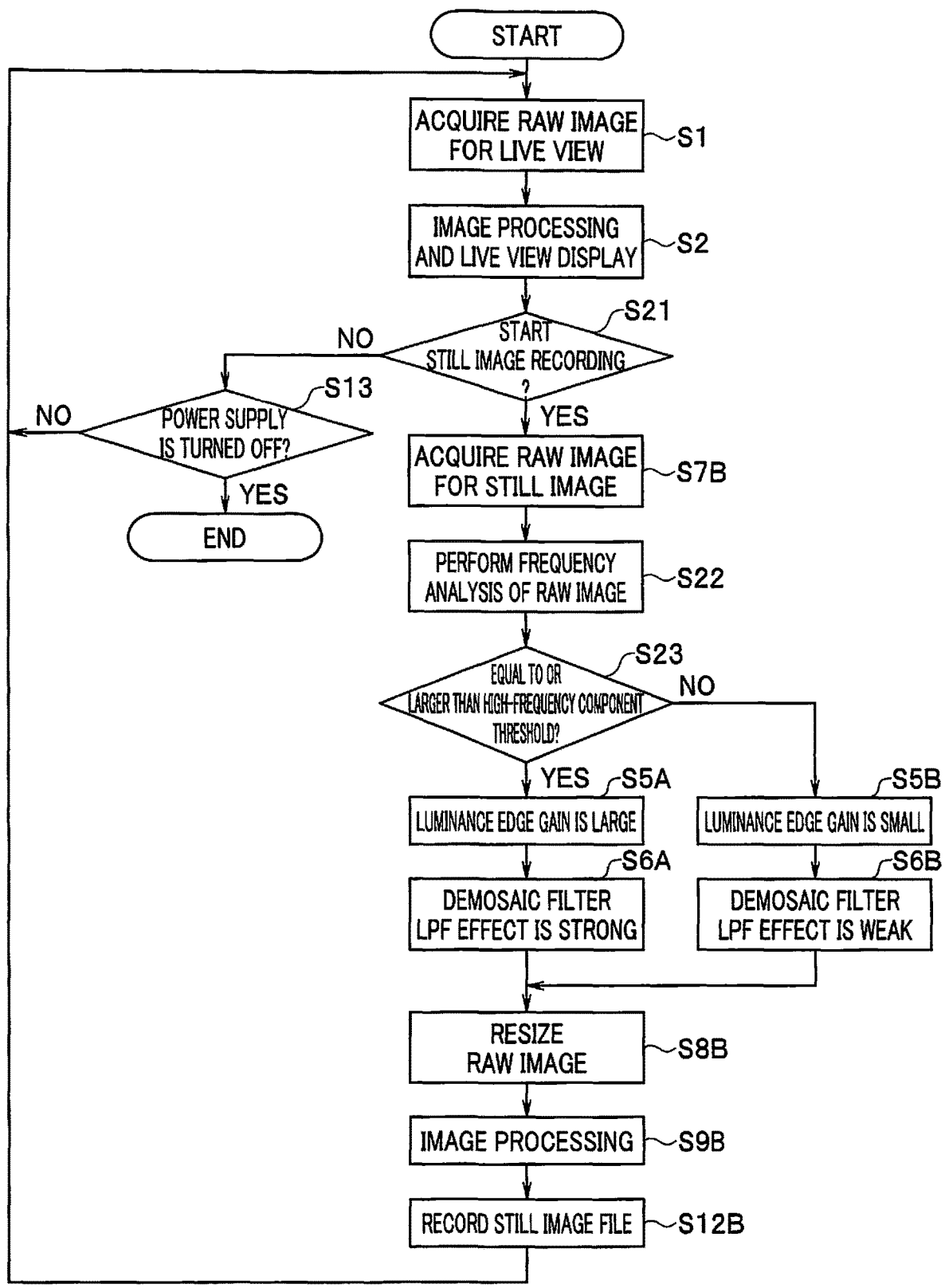
FIG. 11 is a flowchart showing action of an image pickup apparatus applied with an image processing apparatus in the second embodiment.

FIGS. 9 to 11 are diagrams showing a second embodiment of the present invention. FIG. 9 is a block diagram showing a configuration of the first image processing section 26.

In the second embodiment, explanation of the same portions as the portions in the first embodiment explained above is omitted as appropriate by, for example, adding the same reference numerals and signs to the portions. Only differences from the first embodiment are mainly explained.

The first image processing section 26 in this embodiment includes, as shown in FIG. 9, a frequency analyzing section 41 in addition to the RAW-image-data resizing section 27.

The frequency analyzing section 41 analyzes a frequency component of RAW image data outputted from the A/D conversion section 25. More specifically, the frequency analyzing section 41 analyzes and acquires a high-frequency component included in the RAW image data using, for example, a BPF (band-pass filter) or an HPF (high-pass filter) (a filter is not limited to these filters).

FIG. 10 is a graph showing an example in which setting of a value of a luminance edge gain and selection of a type of a demosaic filter are performed according to a high-frequency component of RAW image data. FIG. 11 is a flowchart showing action of an image pickup apparatus applied with an image processing apparatus. Note that, in FIG. 11, processing for photographing a still image after a power supply is turned on and turning off the power supply is shown. Moving image photographing and the like are not shown.

For example, when the processing shown in FIG. 11 is started by, for example, turning on a power button of the image pickup apparatus, live view is performed by the processing in step S1 and step S2 explained above.

Thereafter, the microcomputer 40 determines whether a start of still image recording is instructed by operation of a release button (step S21).

When it is determined by the microcomputer 40 that the recording start is instructed, a RAW image for a still image is acquired by the processing in step S7B explained above.

The frequency analyzing section 41 performs a frequency analysis of the RAW image and acquires a value of a high-frequency component (step S22).

The microcomputer 40 determines, on the basis of an analysis result of the frequency analyzing section 41, whether the high-frequency component of the RAW image is equal to or larger than a predetermined threshold Th1 (see FIG. 10) (step S23).

When determining that the high-frequency component is equal to or larger than the threshold Th1, the microcomputer 40 performs the same processing as the processing in step S5A explained above and sets a large value as a value of a luminance edge gain. However, the value of the luminance edge gain set here is decided according to a high-frequency component as shown in FIG. 10. The large value of the luminance edge gain means a value larger than a value of the luminance edge gain at a time when the high-frequency component is smaller than the threshold Th1.

In the example shown in FIG. 10, the value of the luminance edge gain monotonously increases according to the high-frequency component. Further, before and after the threshold Th1, the value discontinuously changes. However, the change of the value of the luminance edge gain in FIG. 10 is an example. Therefore, a change of the value of the luminance edge gain is not limited to this change.

After performing the processing in step S5A, further, the microcomputer 40 performs the same processing as the processing in step S6A explained above and sets a demosaic filter having a strong effect of a low-pass filter (LPF) (e.g., the demosaic filter shown on the right side in the G component field in FIG. 4).

When determining in step S23 that the high-frequency component is smaller than the threshold Th1, the microcomputer 40 performs the same processing as the processing in step S5B explained above and sets a small value as the value of the luminance edge gain. As explained above, the value of the luminance edge gain set here is decided according to the high-frequency component (see FIG. 10).

After performing the processing in step S5B, further, the microcomputer 40 performs the same processing as the processing in step S6B explained above and sets a demosaic filter having a weak effect of a low-pass filter (LPF) (e.g., the demosaic filter shown on the left side of the G component field in FIG. 4).

After the processing in step S6A or step S6B is performed in this way, the resize of the RAW image is performed by the processing in step S8B explained above, the image processing for a still image is performed by the processing in step S9B explained above, and a still image file is recorded in the recording medium 36 by the processing in step S12B explained above.

On the other hand, when determining in step S21 that the recording start is not instructed yet, the microcomputer 40 determines according to the processing in step S13 explained above whether a power button is turned off. When it is determined in step S13 that the power button is not turned off or when the processing in step S12B is performed, the processing returns to the live view in step S1 and step S2.

When determining in step S13 that the power button is turned off, the microcomputer 40 ends the processing.

Note that, in the above explanation, the frequency analyzing section 41 is provided in the first image processing section 26. This is to reflect the analysis result on the setting on a real time basis since the value of the luminance edge gain and the type of the demosaic filter in the RAW-image-data resizing section 27 are set on the basis of the analysis result of the frequency analyzing section 41. In this way, the frequency analyzing section 41 is suitably provided in the first image processing section 26. However, depending on a configuration of the image pickup apparatus, the frequency analyzing section 41 may be disposed, for example, in the microcomputer 40 (implemented as a function of the microcomputer 40). Therefore, the disposition of the frequency analyzing section 41 is not limited to the disposition in the first image processing section 26.

In the above explanation, both of the selection of the type of the demosaic filter and the setting of the value of the luminance edge gain are performed according to the frequency component analyzed by the frequency analyzing section 41. However, effects can be obtained when only one of the selection of the type of the demosaic filter and the setting of the value of the luminance edge gain is performed. Therefore, at least one of the selection of the type of the demosaic filter and the setting of the value of the luminance edge gain only has to be performed.

According to the second embodiment explained above, it is possible to achieve substantially the same effects as the effects in the first embodiment explained above by performing at least one of the selection of the type of the demosaic filter and the setting of the value of the luminance edge gain according to the frequency component analyzed by the frequency analyzing section 41.

More specifically, when a value of the high-frequency component of the RAW image data is equal to or larger than the threshold Th1, it is possible to improve high-frequency reproducibility by setting the value of the luminance edge gain to a large value, and it is possible to prevent high-frequency moire by using a demosaic filter having a strong LPF effect.

When the high-frequency component of the RAW image data is smaller than the threshold Th1, by setting the value of the luminance edge gain to a small value and using a demosaic filter having a weak LPF effect, it is possible to prevent deterioration in the high-frequency reproducibility of the value of the luminance edge gain when chroma is high.

Third Embodiment

Figure 12:
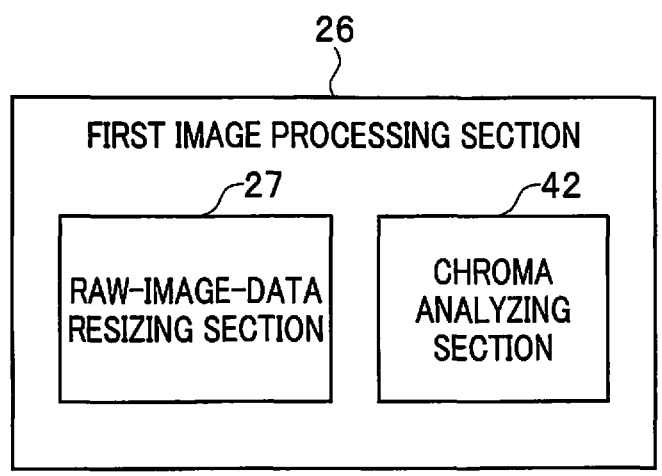
FIG. 12 is a block diagram showing a configuration of a first image processing section in a third embodiment of the present invention.
Figure 13:
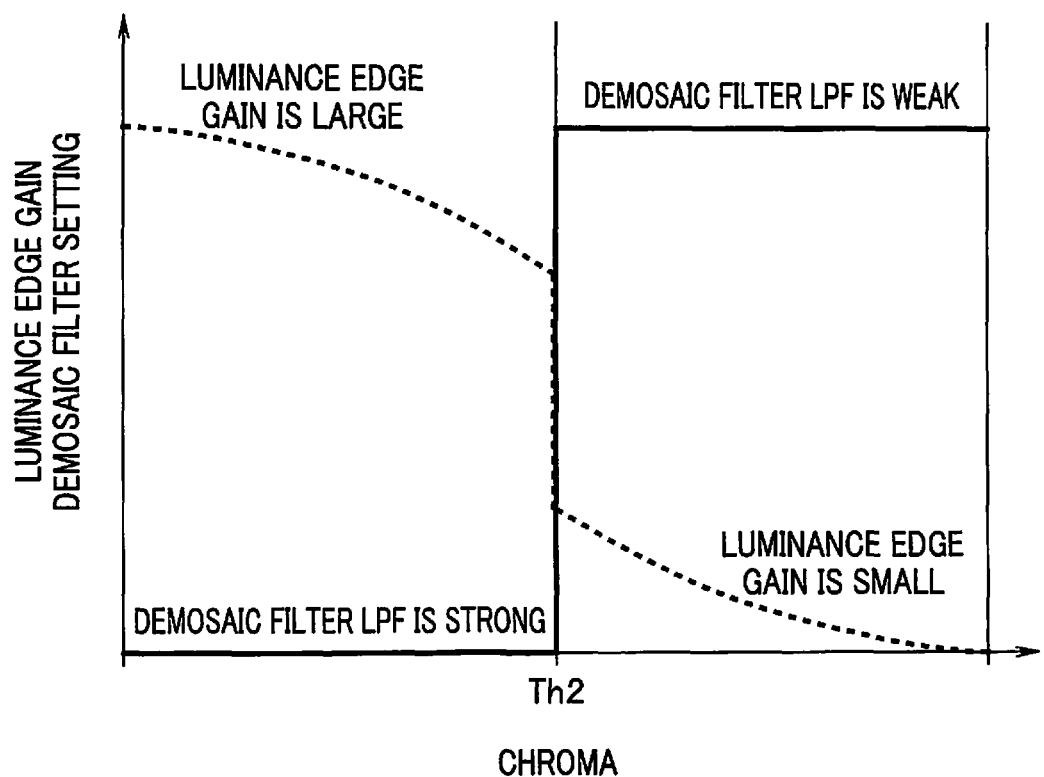
FIG. 13 is a graph showing an example in which setting of a value of a luminance edge gain and selection of a type of a demosaic filter are performed according to chroma of RAW image data in the third embodiment.
Figure 14:
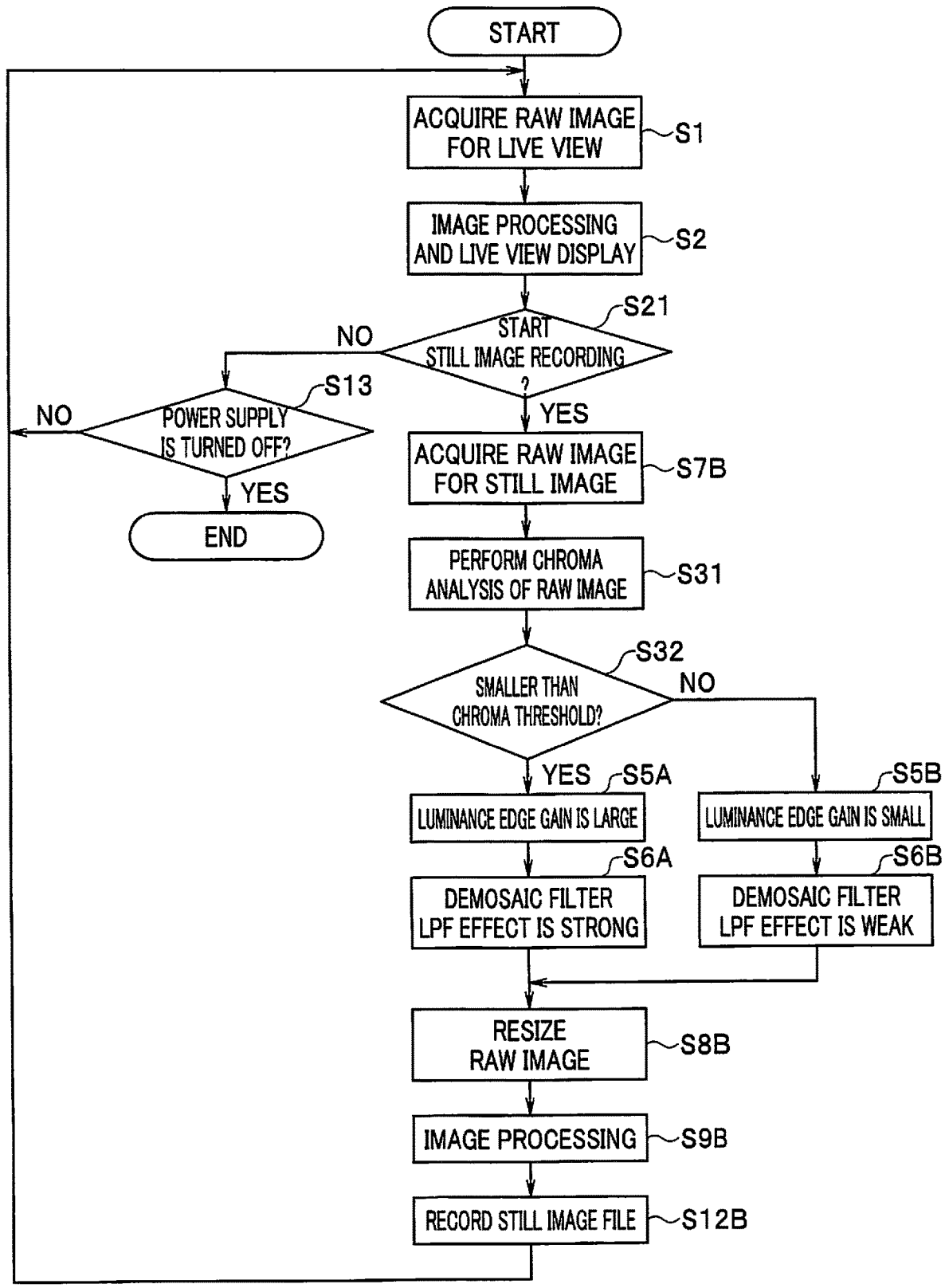
FIG. 14 is a flowchart showing action of an image pickup apparatus applied with an image processing apparatus in the third embodiment.

FIGS. 12 to 14 show a third embodiment of the present invention. FIG. 12 is a block diagram showing a configuration of the first image processing section 26.

In the third embodiment, explanation of the same portions as the portions in the first and second embodiments explained above is omitted as appropriate by, for example, adding the same reference numerals and signs to the portions. Only differences from the first and second embodiments are mainly explained.

The first image processing section 26 in this embodiment includes, as shown in FIG. 12, a chroma analyzing section 42 in addition to the RAW-image-data resizing section 27.

The chroma analyzing section 42 analyzes chroma of RAW image data outputted from the A/D conversion section 25. More specifically, the chroma analyzing section 42 analyzes and acquires chroma included in the RAW image data using, for example, a method of calculating an absolute value of a difference between values of an R pixel and a G pixel and an absolute value of a difference between values of a B pixel and the G pixel or a method of performing color space conversion to calculate a color difference or chroma (the method is not limited to these methods).

FIG. 13 is a graph showing an example in which setting of a value of a luminance edge gain and selection of a type of a demosaic filter are performed according to chroma of RAW image data. FIG. 14 is a flowchart showing action of an image pickup apparatus applied with an image processing apparatus. Note that, in FIG. 14, processing for photographing a still image after a power supply is turned on and turning off the power supply is shown. Moving image photographing and the like are not shown.

For example, when the processing shown in FIG. 14 is started by, for example, turning on a power button of the image pickup apparatus, live view is performed by the processing in step S1 and step S2 explained above. It is determined whether a start of still image recording is instructed by the processing in step S21 explained above.

When it is determined by the microcomputer 40 that the recording start is instructed, a RAW image for a still image is acquired by the processing in step S7B explained above.

The chroma analyzing section 42 performs a chroma analysis of the RAW image and acquires chroma (step S31).

The microcomputer 40 determines, on the basis of an analysis result of the chroma analyzing section 42, whether a value of the chroma of the RAW image is smaller than a predetermined threshold Th2 (see FIG. 13) (step S32).

When determining that the value of the chroma is smaller than the threshold Th2, the microcomputer 40 performs the same processing as the processing in step S5A explained above and sets a large value as the value of the luminance edge gain. However, the value of the luminance edge gain set here is decided according to the value of the chroma as shown in FIG. 13. The large value of the luminance edge gain means a value larger than a value of the luminance edge gain at a time when the value of the chroma is equal to or larger than the threshold Th2.

In the example shown in FIG. 13, the value of the luminance edge gain monotonously decreases according to the value of the chroma. Further, before and after the threshold Th2, the value discontinuously changes. However, the change of the value of the luminance edge gain in FIG. 13 is an example. Therefore, a change of the value of the luminance edge gain is not limited to this change.

After performing the processing in step S5A, further, the microcomputer 40 performs the same processing as the processing in step S6A explained above and sets a demosaic filter having a strong effect of a low-pass filter (LPF) (e.g., the demosaic filter shown on the right side in the G component field in FIG. 4).

When determining in step S32 that the value of the chroma is equal to or larger than the threshold Th2, the microcomputer 40 performs the same processing as the processing in step S5B explained above and sets a small value as the value of the luminance edge gain. As explained above, the value of the luminance edge gain set here is decided according to the value of the chroma (see FIG. 13).

After performing the processing in step S5B, further, the microcomputer 40 performs the same processing as the processing in step S6B explained above and sets a demosaic filter having a weak effect of a low-pass filter (LPF) (e.g., the demosaic filter shown on the left side of the G component field in FIG. 4).

After the processing in step S6A or step S6B is performed in this way, the resize of the RAW image is performed by the processing in step S8B explained above, the image processing for a still image is performed by the processing in step S9B explained above, and a still image file is recorded in the recording medium 36 by the processing in step S12B explained above.

On the other hand, when determining in step S21 that the recording start is not instructed yet, the microcomputer 40 determines according to the processing in step S13 explained above whether a power button is turned off. When it is determined in step S13 that the power button is not turned off or when the processing in step S12B is performed, the processing returns to the live view in step S1 and step S2.

When determining in step S13 that the power button is turned off, the microcomputer 40 ends the processing.

Note that, in the above explanation, the chroma analyzing section 42 is provided in the first image processing section 26. This is to reflect the analysis result on the setting on a real time basis since the value of the luminance edge gain and the type of the demosaic filter in the RAW-image-data resizing section 27 are set on the basis of the analysis result of the chroma analyzing section 42. In this way, the chroma analyzing section 42 is suitably provided in the first image processing section 26. However, depending on a configuration of the image pickup apparatus, the chroma analyzing section 42 may be disposed, for example, in the microcomputer 40 (implemented as a function of the microcomputer 40). Therefore, the disposition of the chroma analyzing section 42 is not limited to the disposition in the first image processing section 26.

In the above explanation, both of the selection of the type of the demosaic filter and the setting of the value of the luminance edge gain are performed according to the value of the chroma analyzed by the chroma analyzing section 42. However, effects can be obtained when only one of the selection of the type of the demosaic filter and the setting of the value of the luminance edge gain is performed. Therefore, at least one of the selection of the type of the demosaic filter and the setting of the value of the luminance edge gain only has to be performed.

According to the third embodiment explained above, it is possible to achieve substantially the same effects as the effects in the first and second embodiments explained above by performing at least one of the selection of the type of the demosaic filter and the setting of the value of the luminance edge gain according to the value of the chroma analyzed by the chroma analyzing section 42.

More specifically, when the value of the chroma of the RAW image data is smaller than the threshold Th2, it is possible to improve high-frequency reproducibility by setting the value of the luminance edge gain to a large value, and it is possible to prevent high-frequency moire by using a demosaic filter having a strong LPF effect.

When the value of the chroma of the RAW image data is equal to or larger than the threshold Th2, by setting the value of the luminance edge gain to a small value and using a demosaic filter having a weak LPF effect, it is possible to prevent deterioration in the high-frequency reproducibility of the value of the luminance edge gain when the value of the chroma is high.

Note that, in the above explanation, the image data obtained by converting the optical information into the electric signal with the image pickup device having the mosaic color array is explained as the example of the RAW image data. However, the RAW image data may be, for example, RAW image data having a mosaic color array generated by a computer and is not limited to the RAW image data obtained by performing image pickup with the image pickup device.

One or more processors configured as hardware may perform the processing of the respective sections explained above.

The image processing apparatus is mainly explained above. However, the present invention may be an image processing method for performing the same processing as the processing of the image processing apparatus or may be an image processing program for causing a computer to perform the same processing as the processing of the image processing apparatus, a non-transitory computer-readable recording medium that records the image processing program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing apparatus that processes RAW image data having a mosaic color array, the image processing apparatus comprising one or more processors including hardware, the one or more processors performing processing of:
   generating a plurality of color planes from the RAW image data using demosaic filters and including a plurality of types of the demosaic filters;
   generating a luminance edge plane from the RAW image data;
   multiplying the luminance edge plane by a value of a gain, wherein the value of the gain is changeable;
   adding, to each of the plurality of color planes, the luminance edge plane multiplied by the value of the gain;
   discriminating which of a still image or a moving image a recording form of the RAW image data is; and
   performing, responsive to a determination that the recording form of the RAW image data is moving image recording, at least one of selecting a type of each of the demosaic filters used, and/or setting of the value of the gain, and
   otherwise, performing, responsive to a determination that the recording form of the RAW image data is still image recording, at least one of selecting a type of each of the demosaic filters having a weaker effect than the demosaic filter selected for the moving image recording, and/or setting of a value of the gain smaller than the value of the gain set for the moving image recording.

2. The image processing apparatus according to claim 1, wherein the one or more processors further perform processing of:
   analyzing a frequency component of the RAW image data; and
   performing at least one of the selection of the type of each of the demosaic filters and the setting of the value of the gain according to the frequency component analyzed.

3. The image processing apparatus according to claim 1, wherein the one or more processors further perform processing of:
   analyzing chroma of the RAW image data; and
   performing at least one of the selection of the type of each of the demosaic filters and the setting of the value of the gain according to the chroma analyzed.

4. The image processing apparatus according to claim 1, wherein the one or more processors further perform processing of:
   resizing the plurality of color planes added with the luminance edge plane multiplied by the value of the gain; and reconstructing, from the resized plurality of color planes, resize RAW image data having a same basic color array as a basic color array of the RAW image data.

5. The image processing apparatus according to claim 4, wherein the one or more processors further perform processing of:
applying a low-pass filter to the plurality of color planes added with the luminance edge plane multiplied by the value of the gain.

6. An image processing method for processing RAW image data having a mosaic color array, the image processing method comprising:
determining which of (A) a still image or (B) a moving image, a recording form of the RAW image data is;
responsive to determining that the recording form of the RAW image data is moving image recording,
performing at least one of (A) selecting a demosaic filter of a first type, and/or (B) setting a luminance edge gain to a first value, and
otherwise, responsive to determining that the recording form of the RAW image data is still image recording,
performing at least one of (A) selecting a demosaic filter of a second type, wherein the second type of demosaic filter has a weaker effect than the first type of demosaic filter, and/or (B) setting a luminance edge gain to a second value, wherein the second luminance edge gain value is smaller than the first luminance edge gain value;
generating a plurality of color planes from the RAW image data using the selected demosaic filter;
generating a luminance edge plane from the RAW image data;
multiplying the luminance edge plane by the set luminance edge gain value; and
adding, to each of the plurality of color planes, the luminance edge plane multiplied by the value of the gain.

7. A non-transitory computer-readable recording medium hat records an image processing program for causing a computer to process RAW image data having a mosaic color array, the image processing program comprising:
determining which of (A) a still image or (B) a moving image a recording form of the RAW image data is;
responsive to determining that the recording form of the RAW image data is moving image recording,
performing at least one of (A) selecting a demosaic filter of a first type, and/or (B) setting a luminance edge gain to a first value, and
otherwise, responsive to determining that the recording form of the RAW image data is still image recording,
performing at least one of (A) selecting a demosaic filter of a second type, wherein the second type of demosaic filter has a weaker effect than the first type of demosaic filter, and/or (B) setting a luminance edge gain to a second value, wherein the second luminance edge gain value is smaller than the first luminance edge gain value;
generating a plurality of color planes from the RAW image data using the selected demosaic filter;
generating a luminance edge plane from the RAW image data;
multiplying the luminance edge plane by the set luminance edge gain value; and
adding, to each of the plurality of color planes, the luminance edge plane multiplied by the value of the gain.

* * * * *